United States Patent

[11] 3,620,921

[72] Inventors Shigeo Abe
Tokyo;
Akira Furuya, Machida-shi; Ryo Okachi,
Machida-shi, all of Japan
[21] Appl. No. 713,320
[22] Filed Mar. 15, 1968
[45] Patented Nov. 16, 1971
[73] Assignee Kyowa Hakko Kogyo Co., Ltd.
Tokyo, Japan
[32] Priority Mar. 18, 1967
[33] Japan
[31] 42/16628

[54] PROCESS FOR PRODUCING 5'-INOSINIC ACID AND 5'-GUANYLIC ACID NUCLEOTIDES
15 Claims, No Drawings

[52] U.S. Cl. ........................................................ 195/28
[51] Int. Cl. ................................................... C12d 13/06

[50] Field of Search ............................................. 195/28 N

[56] References Cited
UNITED STATES PATENTS
3,296,087  1/1967   Mitsugi et al. ................. 195/28 N
3,359,177  12/1967  Nara et al. ...................... 195/28 N

*Primary Examiner*—Alvin E. Tanenholtz
*Attorney*—Craig, Antonelli & Hill

ABSTRACT: A process for simultaneously producing 5'-inosinic acid and 5'-guanylic acid nucleotides such as 5'-guanosine-monophosphate, 5'-guanosine-diphosphate and 5'-guanosine-triphosphate by fermentation which comprises culturing mutant strains of micro-organisms having suitable properties under aerobic conditions in an aqueous nutrient medium containing 5'-xanthylic acid. The products are useful, for example, as flavoring agents.

PROCESS FOR PRODUCING 5'-INOSINIC ACID AND 5'-GUANYLIC ACID NUCLEOTIDES

This invention relates to a process for producing 5'-inosinic acid and 5'-guanylic acid nucleotides, such as, 5'guanosine-monophosphoric acid, 5'-guanosine-diphosphoric acid, and 5'-guanosine-triphosphoric acid. More particularly, it relates to a process for the production of 5'-inosinic acid and 5'-guanylic acid nucleotides by fermentation. Even more particularly, the invention relates to a process for producing said substances by fermentation with mutant strains having particular properties.

5'-guanylic acid nucleotides as well as 5'-inosinic acid have been widely used in the art as flavoring substances. Furthermore, they are important materials in the field of medicine. However, the methods used in the prior art for producing these products have suffered from various disadvantages, including the high costs necessary for carrying them out as well as the low yields of product which are obtained.

One of the objects of the present invention is to provide an improved process for the production of 5'-inosinic acid and 5'-guanylic acid nucleotides which overcomes the disadvantages and deficiencies of the prior art methods.

Another object of the present invention is to provide a process for producing 5'-inosinic acid and 5'-guanylic acid nucleotides by fermentation which may be carried out in an efficacious and simple manner.

A further object of the invention is to provide a process for producing 5'-inosinic acid and 5'-guanylic acid nucleotides 5'which may be carried out advantageously on an industrial scale at low cost to give a high yield of product.

A still further object of the invention is to provide 5'-guanylic acid nucleotides, such as 15'-guanosine-monophosphate, 5'-guanosine-diphosphate and 5'-guanosine-triphosphate, as well as 5'-inosinic acid.

These and other objects and advantages of the present invention will become apparent to those skilled in the art from a consideration of the following specification and claims.

The present invention is characterized by culturing micro-organisms having an ability to produce 5'-inosinic acid and also having an ability to convert 5'-xanthylic acid into 5'-guanylic acid nucleotides in high yield in an aqueous nutrient medium containing 5'-xanthylic acid. 5'-Inosinic acid is accumulated in the resultant culture liquor and, simultaneously, the 5'-xanthylic acid is converted into 5'-guanylic acid nucleotides. Recovery of the products is then effected in a conventional manner.

After much research on the production of nucleotides by fermentation, the present inventors have succeeded in producing mutants of micro-organisms which have the ability to accumulate significant amounts of 5'inosinic acid and, moreover, of converting 5'-xanthylic acid into 5'-guanylic acid nucleotides in high yield. Thus, the present invention provides an industrially feasible method for producing these products at the same time and at low cost.

The micro-organism strains used in the process of the present invention are mutants induced by treating micro-organisms belonging to various genera by irradiation with ultraviolet rays, gamma rays of cobalt 60, etc., or by treating them with various chemical agents such as dimethyl sulfate, nitrous acid, nitrosoguanidine and the like. The resultant mutants have the characteristics of indispensably requiring adenine compounds (adenine, adenosine, or adenylic acid) for their growth or of requiring purine compounds for the acceleration of their growth. As pointed out above, these mutants accumulate significant amounts of 5'-inosinic acid in the culture liquor. Moreover, at the same time, they are characterized by having the ability to convert 5'-xanthylic acid, which is added to the culture medium, into 5'-guanylic acid nucleotides in high yield. Mutants having other nutritional-requiring properties (for example, requiring amino acids, vitamins, purines, pyrimidines and the like for their growth), besides the specific properties noted above, are also obtained.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, as a carbon source, there may be mentioned, by way of example, carbohydrates such as glucose, fructose, maltose, sucrose, starch hydrolysate, molasses, etc., or any other suitable carbon source such as organic acids, for example, acetic acid, lactic acid, glutamic acid, etc. These substances may be used either singly or in mixtures of two or more. As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc. Of course, suitable purine and pyrimidine compounds may also be present in the aqueous nutrient medium.

Moreover, in the case of using strains having particular nutritional requirements, substances which satisfy these nutritional requirements should be added to the culture medium. These include, as stated above, substances such as amino acids, vitamins, purines, pyrimidines, biotin, etc.

It may also be advantageous to employ in the culture medium surface active agents such as those disclosed and discussed in commonly assigned copending application, Ser. No. 643,832, filed on June 6, 1967. The disclosure therein concerning surface active agents is hereby expressly incorporated by reference into the present application. The surface active or dispersing agents to be added to the nutrient medium may be either anionic, cationic or nonionic. Such substances are known in the art and, generically, comprise materials such as the sodium salts of high molecular weight alkyl sulfates or sulfonates, polyoxyethylene glycol derivatives, higher fatty acids having from 12 to 20 carbon atoms, for example, lauric acid, myristic acid, palmitic acid, stearic acid, oleic acid and the like, organic esters of higher fatty acids, such as sorbitan monooleate, etc.

When the mutant strains of the present invention are cultured in a nutrient medium, such as described hereinabove, 5'-inosinic acid is accumulated in the resultant culture liquor. 5'-Xanthylic acid, added to the medium, is converted into 5'-guanylic acid nucleotides and, consequently, these substances are also accumulated in the resultant culture liquor. The 5'-xanthylic acid may be added either at the time of inoculation of the micro-organism into the fermentation medium or after the growth of the micro-organisms. The amount of 5'-xanthylic acid added is usually 5.0–30 mg./ml. However, the amount employed may vary depending upon the particular strains used.

Various forms of 5'-xanthylic acid can be used as the additive to the medium, and the expression "5'-xanthylic acid" used in the present application is intended to cover all of these forms. For example, highly purified 5'-xanthylic acid can be used. Or, crude 5'-xanthylic acid, substances containing 5'-xanthylic acid, or culture liquors containing 5'-xanthylic acid which have been obtained by fermentation can be used if the growth of the micro-organisms, the accumulation of 5'-inosinic acid or the conversion of 5'-xanthylic acid into 5'-guanylic acid nucleotides is not impeded thereby.

The fermentation or culturing of the micro-organisms is conducted under aerobic conditions, such as, aerobic shaking of the culture or with stirring and aeration of a submerged culture, at a temperature of about 20° to 40° C. and at a pH of about 5.5 to 9.0. During culturing, it is desirable to adjust the pH of the culture liquor with hydrochloric acid, sulfuric acid, phosphoric acid, ammonia water, sodium hydroxide, potassium hydroxide, etc., depending upon the particular strains employed.

After about 2 to 8 days of culturing under these conditions, significant amounts of 5'-inosinic acid as well as 5'-guanylic acid nucleotides; namely, 5'-guanosine-monophosphoric acid, 5'-guanosine-diphosphoric acid, an 5'-guanosine-triphosphoric acid, are found singly or in mixture in the resultant culture liquor and in the micro-organism cells.

After the completion of culturing, the 5'-guanylic acid nucleotides and 5'-inosinic acid can be recovered either as a single compound or as a mixture by conventional means, such as, ion-exchange resin treatment, extraction with solvents, precipitation, absorption, chromatography or the like.

The following examples are given merely as illustrative of the present invention and are not to be considered as limiting. Unless otherwise noted, the percentages therein and throughout the application are by weight per liter of water. The micro-organism strains advantageously employed in the present invention are described therein.

EXAMPLE 1

*Brevibacterium ammoniagenes* IXG-21 ATCC 21172 is used as the seed strain. This strain is a mutant obtained by treating *Brevibacterium ammoniagenes* ATCC 6872 with ultraviolet rays. The mutant strain requires adenine for its growth. The seed bacterium is cultured in a culture medium containing 2 percent of glucose, 1 percent of peptone, 1 percent of yeast extract and 0.3 percent of sodium chloride at 30° C. for 24 hours. The seed medium has a pH of 7.2.

The resultant seed culture is inoculated into the fermentation medium in the ratio of 10 percent by volume. Twenty-ml. portions of the seed or fermentation medium are poured into 250-ml. conical flasks and used after sterilization at 120° C. for 10 minutes under pressure. The fermentation medium employed has the following composition:

10% glucose
0.6% urea
1.0% $KH_2PO_4$
1.0% $K_2HPO_4$
1.0% $MgSO_4 \cdot 7H_2O$
0.01% $CaCl_2 \cdot 2H_2O$
30 μg./l. biotin
20 mg./l. adenine
5 mg./l. vitamin $B_1$
10 mg./l. calcium pantothenate
1.0% meat extract The pH of the fermentation medium is adjusted to 7.8 with dilute sodium hydroxide. 5'-Xanthylic acid (80% purity) has previously been added to the fermentation medium in an amount necessary to give a final concentration of 25 mg./ml. before the inoculation of seed culture into the fermentation medium.

Culturing is then carried out with aerobic shaking of the culture at 30° C. for 120 hours. The pH of the medium is adjusted to 7.5 during culturing with dilute ammonia water, starting 72 hours after the beginning of cultivation and continuing until the end. After the completion of fermentation, 10.8 mg./ml. of 5'-guanosine-monophosphoric acid, 2.4 mg./ml. of 5'-guanosine-diphosphoric acid, 8.2 mg./ml. of 5'-guanosine-triphosphoric acid and 12.7 mg./ml. of 5'-inosinic acid are accumulated in the culture liquor. Small amounts of 5'-xanthylic acid, guanosine, guanine and hypoxanthine are also accumulated in the fermentation liquor.

One liter of the filtrate obtained by filtering the micro-organism cells from the culture liquor is adjusted to a pH of 2.0 with hydrochloric acid and then adsorbed with active carbon. The effluent obtained with ethanolic ammonia is then concentrated. Thereafter, the pH of the concentrated solution is adjusted to 2.5, and the solution is passed through an anion exchange resin (Dowex-1, Cl-type) and eluted with hydrochloric acid. Fractions containing 5'-inosinic acid, 5'-guanosine-monophosphoric acid, 5'-guanosine-diphosphoric acid and 5'-guanosine-triphosphoric acid are recovered. The solutions containing these fractions are adjusted to a pH of 7.0 and concentrated under reduced pressure. Ethanol is added thereto, and a mixture of sodium salts of 5'-inosinic acid and 5'-guanylic acid nucleotides separates. The yield is 21.4 grams.

The mixture of sodium salts is again passed through an anion exchange resin (Dowex-1, Cl-type), and the four compounds, 5'-inosinic acid, 5'-guanosine-monophosphoric acid, 5'-guanosine-diphosphoric acid and 5'-guanosine-triphosphoric acid, adsorbed thereon are fractionally eluted, thereby effecting a separation thereof. The pH of each fractional solution is adjusted to 7.0, and the solutions are concentrated under reduced pressure. Ethanol is added thereto, and each of the compounds is separated as the sodium salt. The yield is 8.7 g. of 5'-inosinic acid, 8.2 g. of 5'-guanosine-monophosphoric acid, 1.8 g. of 5'-guanosine-diphosphoric acid and 6.7 g. of 5'-guanosine-triphosphoric acid.

EXAMPLE 2

*Brevibacterium ammoniagenes* IXG-21 ATCC 21172 is again employed as the seed micro-organism. A seed culture is obtained by using the same medium and conditions as described in example 1.

The resultant seed culture is inoculated in an amount of 10 percent by volume into a fermentation medium having the following composition:

15% glucose
0.6% urea
0.5% $KH_2PO_4$
0.5% $K_2HPO_4$
0.5% $MgSO_4 \cdot 7H_2O$
0.01% $CaCl_2 \cdot 2H_2O$
10 mg./l. $FeSO_4 \cdot 7H_2O$
1 mg./l. $ZnSO_4 \cdot 7H_2O$
3 mg./l. $MnCl_2 \cdot 4H_2O$
5 mg./l. vitamin $B_1$
10 mg./l. calcium pantothenate
30 mg./l. adenine
30 μg./l. biotin
1.0% meat extract Culturing is carried out at 35° C. for 72 hours. Then, a fermentation liquor containing 5'-xanthylic acid (containing 30 mg./ml. of 5'-xanthylic acid) is added in an equivalent amount to the fermentation liquor of the present example. Also, a surface active agent, Cation F2-50 (alkyl-dimethyl-benzyl ammonium chloride, manufactured by Nippon Yushi Co., Ltd.,) is added to the medium in the amount of 3.0 mg./ml. Culturing is then continued for another 48 hours. During the cultivation, ammonium chloride solution is added to the medium so to give a final concentration thereof of 0.5%. The pH of the medium is adjusted to 7.6 with dilute sodium hydroxide solution during culturing.

After the completion of fermentation, 8 mg./ml. of 5'-inosinic acid, 4 mg./ml. of 5'-guanosine-monophosphoric acid and 7 mg./ml. of 5'-guanosine-triphosphoric acid are accumulated in the culture liquor. In addition, small amounts of 5'-guanosine-diphosphoric acid, 5'-xanthylic acid, guanosine and guanine are found in the culture liquor.

EXAMPLE 3

The mutant strain *Corynebacterium glutamicum* IXG-31 ATCC 21173 is used as the seed bacterium. This mutant is obtained by treating *Corynebacterium glutamicum* ATCC 13032 with nitrosoguanidine. The mutant strain ATCC 21173 has the specific property that its growth is considerably accelerated by adenine, guanine or hypoxanthine. A seed culture thereof is inoculated in the ratio of 10 percent by volume into a fermentation medium having the following composition:

13% glucose
1.0% $KH_2PO_4$
1.0% $K_2HPO_4$
1.0% $MgSO_4 \cdot 7H_2O$
1.5% $NH_4Cl$
0.5% yeast extract
3% $CaCO_3$ The fermentation medium has a pH of 7.3. At the time of inoculation of the seed culture into the fermentation medium, 5'-xanthylic acid is also added in the amount of 20 mg./ml. THe other culturing conditions are the same as described in example 1. After 120 hours of culturing, 8.1 mg./ml. of 5'-inosinic acid, 7.5 mg./ml. of 5'-guanosine-monophosphoric acid and 8.4 mg./ml. of 5'-guanosine-diphosphoric acid are accumulated in the culture liquor. The accumulation of small amounts of 5'-xanthylic acid, guanosine and guanine is also recognized in the fermentation liquor.

EXAMPLE 4 X

Using the same seed medium and fermentation medium as described in example 1, culturing is conducted with aerobic shaking at 30° C. for 120 hours using the mutants of the various kinds of micro-organisms shown in table 1. The other conditions of culturing are identical with those described in example 1, except that 5'-xanthylic acid is added to the fermentation medium in the concentration of 20 mg./ml. at the time of inoculation. The amounts of 5'-inosinic acid and 5'-guanylic acid nucleotides accumulated in the resultant culture liquors are shown in table 1.

selected from the group consisting of *Brevibacterium ammoniagenes* and *Corynebacterium glutamicum*, said micro-organism being capable of producing 5'-inosinic acid and also being capable of converting 5'-xanthylic acid directly into 5'-guanylic acid nucleotides, under aerobic conditions in an aqueous nutrient medium containing 5'-xanthylic acid, simultaneously accumulating 5'-inosinic acid and the 5'-guanylic acid nucleotides in the resultant culture liquor, and recovering said 5'inosinic acid and 5'-guanylic acid nucleotides therefrom.

2. The process of claim 1, wherein culturing is carried out at a temperature of about 20° to 40° C. and at a pH of about 5.5 to 9.0.

3. The process of claim 1, wherein said nutrient medium contains about 5.0 to 30 mg./ml. of 5'-xanthylic acid.

4. The process of claim 1, wherein said 5'-guanylic acid nucleotides are selected from the group consisting of 5'-guanosine-monophosphate, 5'-guanosine-diphosphate and 5'-guanosine-triphosphate.

5. The process of claim 1, wherein a culture liquor containing 5'-xanthylic acid is added to said nutrient medium.

6. The process of claim 1, wherein said nutrient medium also contains a surface active agent.

7. The process of claim 1, wherein said 5'-xanthylic acid is added to the nutrient medium at the initiation of culturing.

8. The process of claim 1, wherein said 5'-xanthylic acid is added to the nutrient medium after the initiation of culturing.

9. The process of claim 1, wherein said micro-organism is *Brevibacterium ammoniagenes* ATCC 21172.

TABLE I

| Strains | | | amount of nucleotides accumulated (mg./ml) | | | |
|---|---|---|---|---|---|---|
| Genus and species | Strain No. | Source of mutation | 5'IMP[1] | 5'-GMP[2] | 5'-GDP[3] | 5'-GTP[4] |
| *Arthrobacter ureafaciens* | IXG-01 | Ultraviolet rays | 8.8 | 7.3 | 2.4 | 4.5 |
| *Bacillus megaterium* | IXG-11 | γ-rays[5] | 4.3 | 2.1 | 3.3 | 2.6 |
| *Brevibacterium ammoniagenes* | IXG-22 | Nitrosoguanidine | 14.5 | 7.3 | 4.4 | 6.5 |
| *Corynebacterium glutamicum* | IXG-32 | Ultraviolet rays | 6.8 | 4.3 | 2.8 | 6.4 |
| *Microbacterium flavum* | IXG-41 | Nitrosoguanidine | 4.5 | 8.3 | Trace | 3.3 |
| *Micrococcus sodonensis* | IXG-51 | Ultraviolet rays | 4.5 | 3.8 | 2.4 | 7.3 |
| *Pseudomonas aeruginosa* | IXG-61 | Diethylsulfate | 5.3 | Trace | 2.8 | 4.3 |
| *Proteus vulgaris* | IXG-71 | Nitrous acid | 5.1 | Trace | 1.4 | 2.5 |
| *Sarcina lutea* | IXG-81 | Nitrosoguanidine | 5.9 | 8.6 | 2.5 | Trace |
| *Escherichia coli* | IXG-91 | γ-rays | 2.5 | 3.8 | 2.6 | 4.4 |

[1] 5'-IMP=5'-inosinic acid.
[2] 5'-GMP=5'-guanosine-1-phosphoric acid.
[3] 5'-GDP=5'-guanosine-2-phosphoric acid.
[4] 5'-GTP=5'-guanosine-3-phosphoric acid.
[5] γ-rays derived from cobalt-60.

It can be seen from the above examples that strains of micro-organisms belonging to a wide variety of genera may be employed in the present invention. The main prerequisite therefor is that the strain used be capable of producing 5'-inosinic acid and of converting 5'-xanthylic acid into the desired 5'-guanylic acid nucleotides The invention being thus described, it will be obvious that the same may be varied in many ways. Such variations are not to be regarded as a departure from the spirit and scope of the invention, and all such modifications are intended to be included within the scope of the following claims.

1. A process for producing 5'-inosinic acid and 5'-guanylic acid nucleotides which comprises culturing a micro-organism 10. The process of claim 1, wherein said micro-organism is *Corynebacterium glutamicum* ATCC 21173.

11. The process of claim 2, wherein aid nutrient medium contains about 5.0 to 30 mg./ml. of 5'-xanthylic acid.

12. The process of claim 11, wherein said 5'guanylic acid nucleotides are selected from the group consisting of 5'-guanosine-monophosphate, 5'-guanosine-diphosphate and 5'-guanosine-triphosphate.

13. The process of claim 12, wherein said nutrient medium also contains a surface active agent.

14. The process of claim 12, wherein said micro-organism is *Brevibacterium ammoniagenes* ATCC 21172.

15. The process of claim 12, wherein said micro-organism is *Corynebacterium glutamicum* ATCC 21173.